US007406357B2

(12) United States Patent
Ocke et al.

(10) Patent No.: US 7,406,357 B2
(45) Date of Patent: Jul. 29, 2008

(54) TRANSFORMING A PRODUCT DESCRIPTION INTO A PROCESS NETWORK AND SPECIFYING PRODUCT CREATION

(75) Inventors: Kirk John Ocke, Ontario, NY (US); Michael D. Shephard, Ontario, NY (US); Frank M. Goetz, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 313 days.

(21) Appl. No.: 11/121,629

(22) Filed: May 3, 2005

(65) Prior Publication Data

US 2006/0253213 A1    Nov. 9, 2006

(51) Int. Cl.
*G06F 19/00* (2006.01)
*H04K 1/00* (2006.01)
(52) U.S. Cl. ............................. 700/97; 705/54; 700/117
(58) Field of Classification Search .................. 700/97, 700/117; 705/54
See application file for complete search history.

(56) References Cited

U.S. PATENT DOCUMENTS

| 6,591,259 B1 * | 7/2003 | Sholars ........................... 707/1 |
| 2003/0167098 A1 * | 9/2003 | Walser et al. ................ 700/100 |
| 2006/0155700 A1 * | 7/2006 | Dejean et al. .................. 707/6 |

OTHER PUBLICATIONS

Plaza et al.,"Model-based Knowledge Acquisition for Heuristic Classification Systems" 1989 Sigart p. 98-105.*
Carlsen et al., "Evaluating Flexible Workflow Systems" 1997 IEEE p. 230-239.*
Ozkaya-I., "Data and Decision Support with Dynamic Representation of Multiple System Requirements Models for Building Design" Masters Thesis 2000 p. 1-73.*
Schmall-M., "Playing in Unique—Heuristic Technologies based on Metalanguages" Proceedings of the 11th Virus International Conference and Exhibition. Sep. 2001 abstract p. 1-2.*

* cited by examiner

*Primary Examiner*—Albert DeCady
*Assistant Examiner*—Thomas H Stevens
(74) *Attorney, Agent, or Firm*—Kermit D. Lopez; Luis M. Ortiz; Ortiz & Lopez, PLLC

(57) ABSTRACT

Product descriptions (e.g., brochures) and processing instructions required to create a product (impose, print, fold, staple) can be abstracted into common vocabularies that link one to the other. A link from a product description to the processing instructions is made. A set of pre-defined templates containing specific processing instructions can be selected. Templates representing the processing instructions have a set of capabilities for the process network described. Templates representing the processing instructions can associate a set of well-defined queries regarding the product description, answers to which are used to complete process templates. A System of Classification when constructed can be used to classify a vocabulary to describe products and a separate vocabulary to describe required processing for the product(s). Once a System of Classification is established, templates for various product classes can be created. A heuristic engine can classify Product Descriptions into a product class in the System of Classification.

18 Claims, 4 Drawing Sheets

TRANSFORMING A PRODUCT DESCRIPTION INTO A PROCESS NETWORK AND SPECIFYING PRODUCT CREATION

TECHNICAL FIELD

Embodiments generally relate to print product descriptions and also relate to process workflows. More particularly, the embodiments relate to a system and methods for translating a print product description, such as a book, into an appropriate process workflow required to create a desired end product.

BACKGROUND

The description of a product is in a vocabulary specific to the nature of the product, whereas the description of the steps required to create the product are in a vocabulary or several vocabularies specific to the processes involved in creating the various components of the product. Translation of the product description into a detailed set of processing instruction is done manually and can be time consuming. Manual translation depends heavily on individual expertise, thereby creating a scarce resource, e.g., an expert whose job it is to translate product descriptions into processing instruction. For low-margin, quick turn-around business such as that conducted by print shops, manual tasks requiring extensive human expertise are significant factors in the cost of creating the end product.

BRIEF SUMMARY OF EMBODIMENTS

It is a feature of the preferred embodiment to abstract a product's general description and the processing instructions required to create the product into a common vocabulary that links them together.

Accordingly, it is a feature of the embodiment that a product's description (e.g., create a 4 page brochure) and the processing instructions required to create the product (e.g., impose, print, fold, staple) can be abstracted into a common vocabulary or classification system that links one to the other.

According to another feature, a set of pre-defined templates containing specific processing instruction can be selected for product processing once a link from product description to processing instructions is made.

According to another aspect of the present embodiment, a pre-defined template includes a set of capabilities from a described process network and a set of well-defined queries regarding a product's description.

In accordance with another aspect of the embodiments, a heuristic engine executes queries used to populate a template with processing instructions to create a completely specified process template.

In accordance with another aspect of the embodiments, a process can include the steps of Classifying a Product Description in a class within the System of Classification; Selecting Templates for the class that represents the Product Description; for each Template:

a. using a "rules based" method (or other applicable method) the Heuristics Engine asks the Product Description the "questions" associated with the template;
b. the Heuristic Engine populates the Template with the answers to the questions (thereby completing the template);
c. the completed Template as specified with Processing Instructions (now a Process Network) is compared against the capabilities description associated with the Template); and, the completed set of templates (Process Networks) is provided to an agent.

BRIEF DESCRIPTION OF THE DRAWINGS

The accompanying figures, in which like reference numerals refer to identical or functionally-similar elements throughout the separate views and which are incorporated in and form part of the specification, further illustrate the embodiments.

DETAILED DESCRIPTION OF EMBODIMENTS

The particular definitions, values and configurations discussed in these non-limiting examples can be varied and are cited merely to illustrate an embodiment and are not intended to limit the scope of the embodiments.

Definitions:

JDF (Job Definition Format): A formal language that describes both products and the processes required for creating products. Specifically JDF describes products and processes used in print shops.

JDF Process Group: A Tree of JDF Process Nodes. (more generally, a Process Network).

JDF Process Node: A set of processing instructions sufficient to describe the details of a particular process step. Examples of JDF Process Nodes are: Digital Printing, Imposition, Stitching, (a set of processing instructions).

JDF Product Node: A description of a product such as a Book, Business Card or Brochure. (more generally, a Product Description).

Product Class: General term for description of the product (as defined by JDF Product Node).

Product Description: A product described using a formal unambiguous vocabulary. An example of a product description vocabulary is the Product Node in JDF.

Processing Instructions: Instructions sufficient to execute a particular process. An example of processing instructions is the Process Node construct in JDF.

Process Network: A set of processing instructions that when executed in the order specified by the process network result is a product. A process network is synonymous with a workflow.

Workflow: A Process Network (as defined above).

Vocabulary: specific language for communicating between product and process.

Workflow Template: A Workflow partially populated with Processing Instructions.

Figure 1:
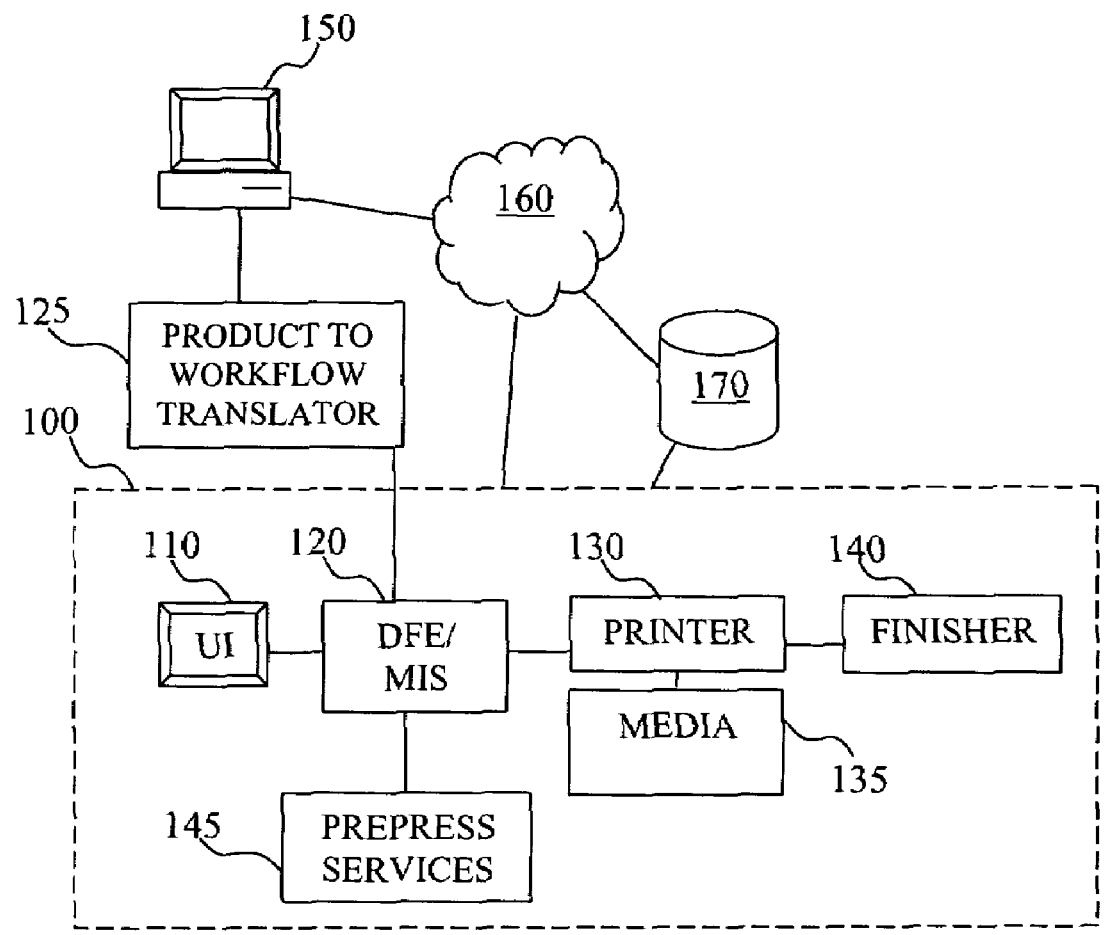
FIG. 1 illustrates components of a system linking a product's description and processing instructions required to create the product using a common vocabulary or classification system.

Capability Description: All possible Processing Instructions that can be performed in a Workflow Referring to FIG. 1 components of a system 100 that can be utilized in accordance with carrying out the embodiments is illustrated. A typical printing system includes a user interface 110, a digital front end (DFE) 120, and a print engine 130. The DFE or MIS 120 includes access to modules 125 to assist with product to workflow translation, typically embodied in software, and also enables image processing and control function. Various prepress services 145 may optionally be invoked from the MIS or other print job controller. The print engine 130 has access to media 135 of various size and cost. A finisher 140 operates after a job is printed by the print engine 130 to manage arrangement of the print job, which can include sorting, cutting and stapling functions. A user can access and operate the printing system 100 using the user interface 110 or via a workstation 150. A workstation 150 can communicate with a printing system 100 utilizing a communications network 160. A user profile, work product for printing, media library and print job parameters can be stored in a database 170 or memory also accessible by the workstation 150 or printing system 100 via the network 160, or which can be directly accessed via the printing system 100. A printing system 100 can be improved in accordance with features of the embodiments to include a product to workflow translator module 125 as shown in FIG. 1.

Figure 2:
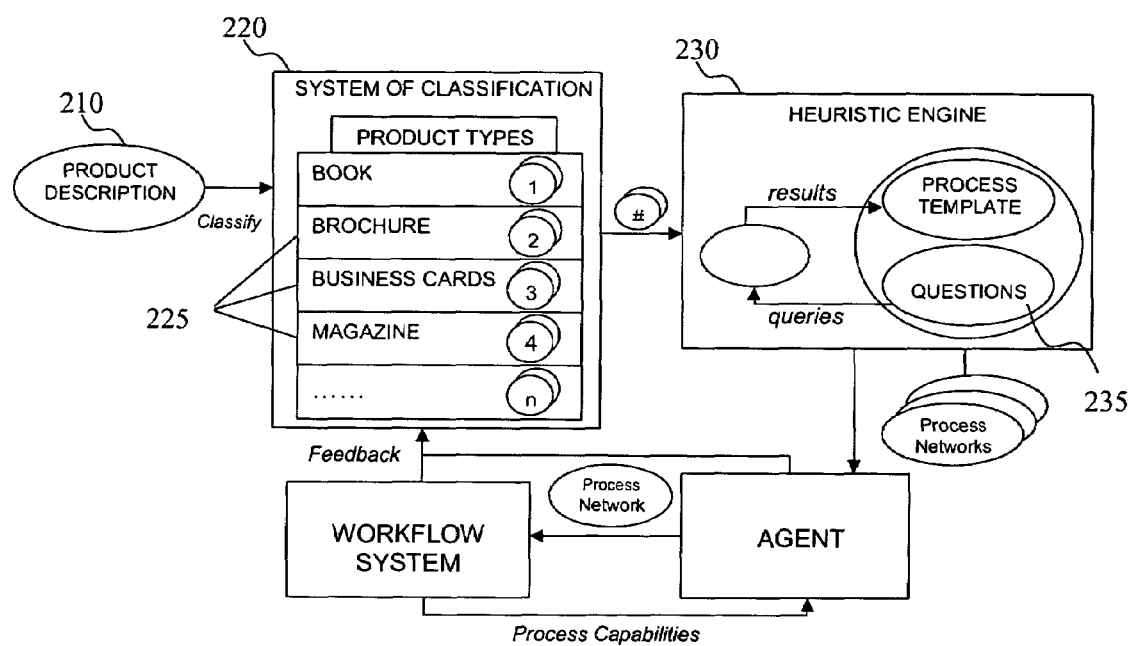
FIG. 2 illustrates a flow diagram of operations between modules in accordance with carrying features of the embodiments.

Referring to FIG. 2, a product description 210 can be linked to a set of processing instructions to create the product by classifying a product description and the processing instructions using a common classification system 220. Predefined templates 225 representing process networks (workflows) can be created and classified into the same product classification system 220 used to classify product descriptions. A heuristic engine 230 executes "questions" 235 used to populate the template with processing Instructions. Each template can include: i) a capability description which is a description of the possible processing Instructions of the workflow, and ii) a set of well-defined "questions" to be asked of the product description submitter to populate the processing Instructions.

The system classification module 220 can include access to memory for storing predefined templates. The classification module 220 enables a system of classification in accordance with a feature of the embodiment. Given a vocabulary to describe products and a separate vocabulary to describe the processing required to create the product, a System of Classification can be constructed that can be used to classify both.

Considering the fact that a product description must always be transformed into a set of processing instructions in order to actually create the described product, one of the pre-requisites for the automated conversion of intent to process is a well-defined product description. An example is JDF Product Intent. As an example: if a waiter takes a customer order, specifically, "ham and swiss on rye with lettuce and mayo." The waiter delivers the order to the cook who immediately recognizes that this product is a "sandwich." Since the cook also knows how to create a "sandwich" he has successfully classified the product description and process of creating the product to the same class, namely, "sandwich." Establishing the System of Classification is typically driven by the product descriptions since they represent most closely the end product. In a print shop the classes of things could be of the form of a "brochure," a "book," "business cards," etc.

Once the System of Classification is established, predefined templates for the various product classes can be created and stored in memory. The templates are partially completed process network (workflow) specifications for creating a particular product. Each product class in the system of classification may have several templates associated with it, one for each distinct process network (workflow) that can be used to create the product. Associated with each template is a capabilities description specific to the process network (workflow) defined by the template, enabling reliable validation of the completed template and ensuring that the template was not completed with parameters beyond the capabilities of the specific workflow. Also associated with each template is a set of "questions" that must be answered in order to complete the template. The "questions" are typically asked of the Product Description and the answers provided to the template in order to populate with Processing Instructions to form a completely specified Process Network (Workflow).

Figure 3:
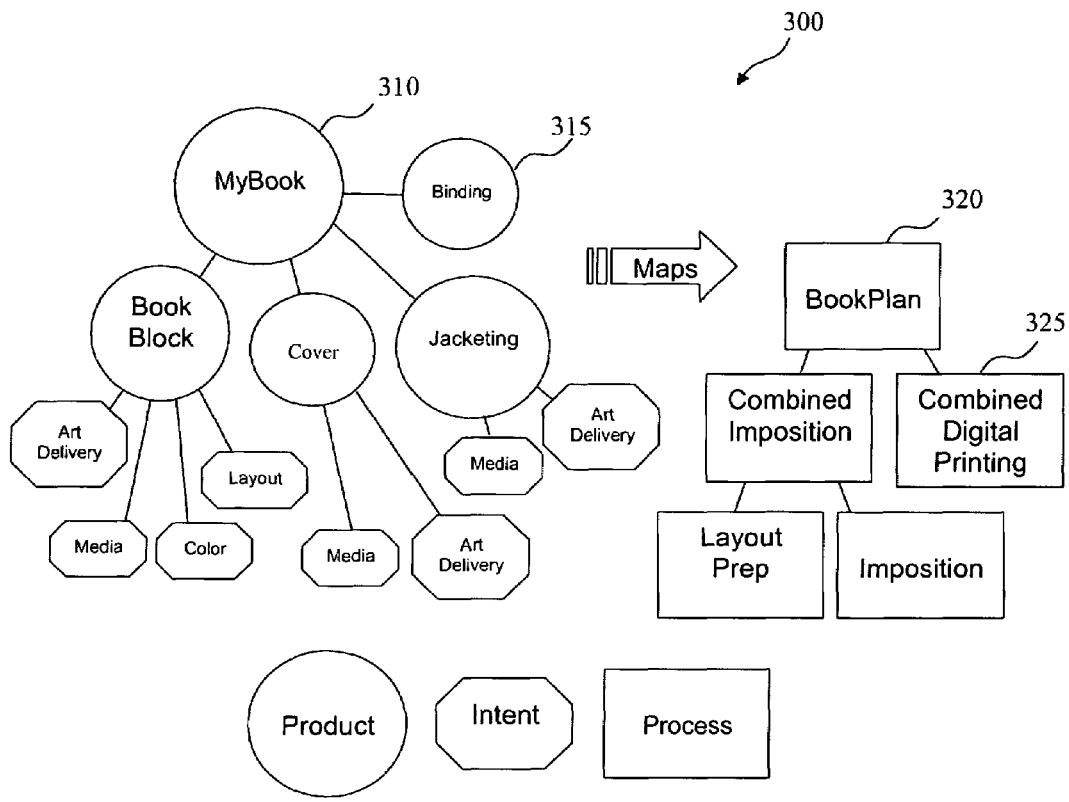
FIG. 3 illustrates a sample product classification and template.

Referring to FIG. 3, a sample product classification and template 300 referred to as the "MyBook" is illustrated. The "MyBook" reveals the intent as a binding operation under the Intent Node descriptions tab 315, which is a subcategory to the Product Intent 310 portion of sample 300. Under the Process Template 320 portion of sample 300, a correlating process plan name, "BookPlan", further specifies the process plan," under the process node descriptions 325.

"Questions" are typically about Product Description and the answers are provided to the template in order to populate it with Processing Instructions to form a completely specified Process Network (Workflow). A set of "questions" is realized by a vocabulary which links the high level information of the product description to the more detailed information required in the processing instructions. The set of "questions" can be encoded in a linear, programmatic manner, or as rules that query the product description and populate the parameters in the process network template. Using the Deli example described above, the set of questions may include: a) what kind of meat if any? b) What kind of bread? c) Is the bread toasted? d) What condiments? The cook needs to answer each of these questions by examining the order before starting the process of making the sandwich. Notice that the set of questions is consistent for several types of sandwiches. "Questions" as rules would allow for a non-linear, but prioritized, method of constructing the Workflow necessary to produce the specified Product. For instance, it could be specified that the bread must be toasted before placement of sandwich contents, but the sandwich contents may be placed in any order.

The predefined templates in a print shop can represent various workflows such as "Imposition+Print+Trim" or "Preflight+Imposition+Print". Multiple templates with the same process steps could be differentiated by the attributes on a process, such as Imposition producing "portrait" oriented pages in one workflow and "landscape" oriented pages in another workflow.

The heuristic engine 230, shown in FIG. 2, classifies Product Descriptions into a product class in the System of Classification. Once the Product Description is classified, the set of templates for the class in the System of Classification are selected. Using the set of "questions" associated with the template a heuristic or rules based method is used to ask questions of the Product Description and provide the answers to the template. In order for the Heuristic engine to be more than a one off implementation, a well-defined, extensible method for handling the questions is preferred. A rules based method is appropriate since it is both well-defined and extensible (new or different rules). Other methods that satisfy the constraints of well-defined (easy to add new questions) and extensible can also be used. The engine will also need heuristics based on the domain of the specific problem in order to make use of the rules based method. Such heuristics can include aspects of the syntactical constructs used in Product Descriptions or Templates that would be cumbersome to include in the "rules" used to ask the questions.

Figure 4:
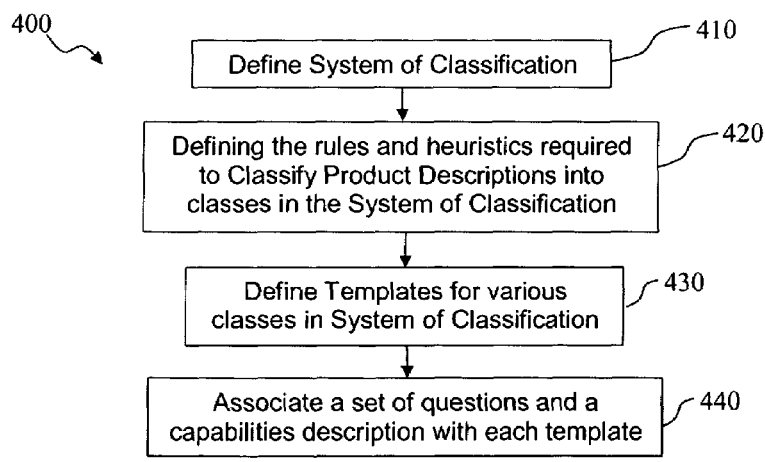
FIG. 4 illustrates a flow diagram of process steps in accordance with features of the embodiments.

The steady state process defined in this invention requires a boot strap process. Referring to FIG. 4, the process includes the following steps, illustrated in flow chart 400:

Step 410—Defining the System of Classification.

Step 420—Defining the rules and heuristics required to Classify Product Descriptions into classes in the System of Classification.

Step 430—Defining Templates for the various classes in the System of Classification.

Step 440—Associating with each template a set of questions and a capabilities description.

Many of the steps in the Boot Strap Process can be automated in many problem domains. A useful feature embodiment of the invention for a particular problem domain includes an initial set of artifacts produced by the Boot Strap Process in order to expedite deployment.

Figure 5:
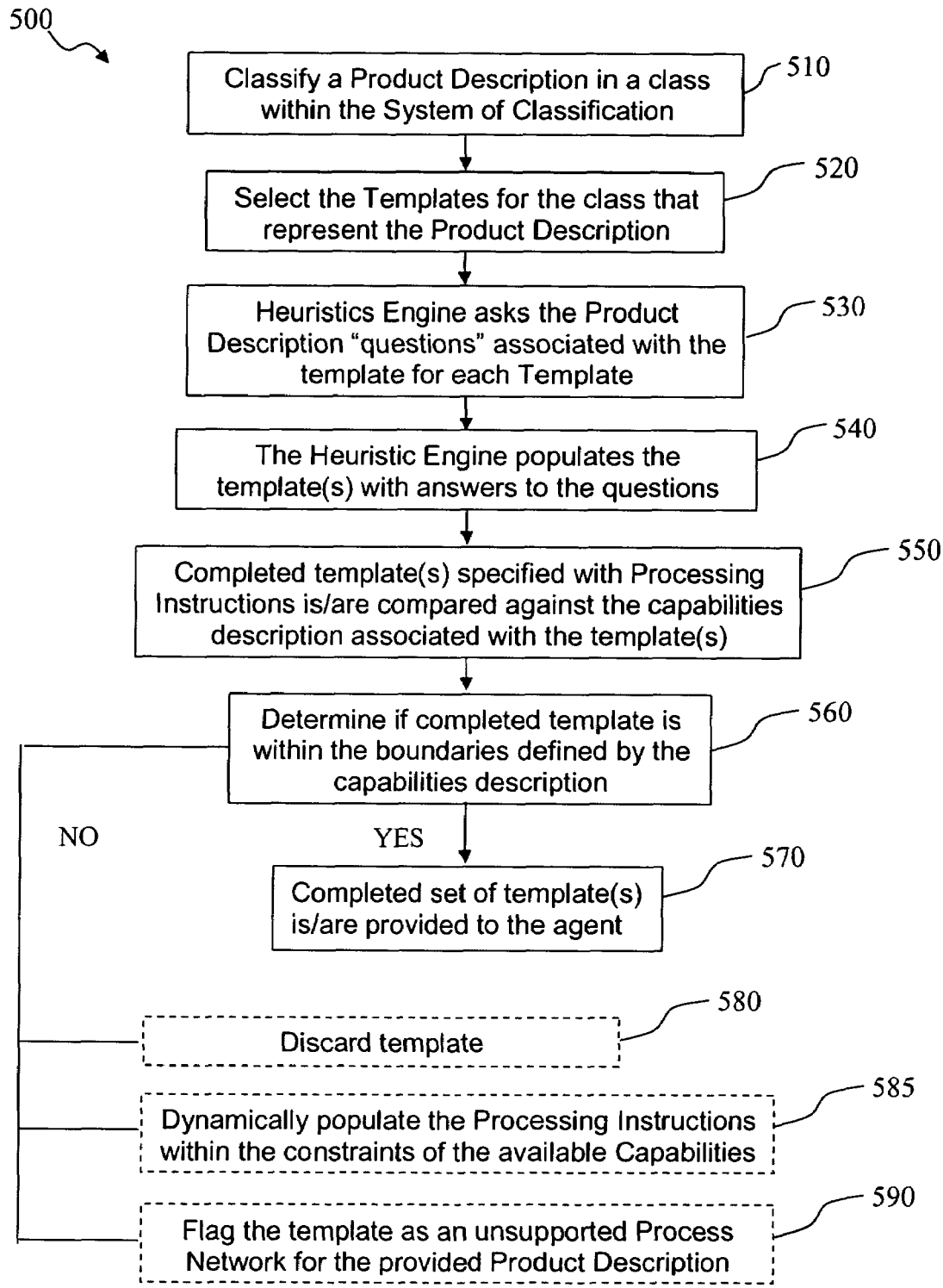
FIG. 5 illustrates another flow diagram of process steps in accordance with additional feature of the embodiments.

Referring to FIG. 5, a steady state process has already been outlined in the description above, but it can be condensed it into an enumerated set of steps, as illustrated by flow chart 500. including the following.

Step 510—Classify a Product Description into a class within the System of Classification.

Step 520—Select the Templates for the class that represents the Product Description.

Step 530—Using a "rules based" method (or other applicable method) the Heuristics Engine asks the Product Description "questions" associated with the template for each Template.

Step 540—The Heuristic Engine populates the template(s) with answers to the questions (thereby completing the template).

Step 550—The completed template(s) as specified with Processing Instructions (now a Process Network) is/are compared against the capabilities description associated with the Template(s).

Step 560—Determine if the completed template (Process Network) is within the boundaries defined by the capabilities description.

Step 570—If it is determined that the completed template is within the boundaries defined by the capabilities description, then the completed set of template(s) (Process Networks) is/are provided to the agent.

If it is determined that the completed template is not within the boundaries defined by the capabilities description, it can either be discarded as shown in Step 580; dynamically populate the Processing Instructions within the constraints of the available Capabilities as shown in Step 585; or, the particular template can be flagged as an unsupported Process Network for the provided Product Description as shown in Step 590.

The definition of "completed" can include templates that are only "partially completed" and require additional information to be "completed." Such "partially completed" templates still fall within the umbrella of this invention, but are not discussed in depth since the steps required to complete the "partially completed" template are beyond the scope of this invention.

A robust and extensible method to convert JDF product descriptions, such as one that describes a "brochure" or a "book", into a print shop workflow that can create the product is important for workflow products. An example use of the embodiment in terms of JDF can be described as follows: The system of classification is comprised of classes for products that can be created by a print shop such as "Brochure," "Book" and "Business Card." JDF is an XML based format that includes the concept of Process Templates and Capability Descriptions. A set of "questions" can be added to JDF by combining a pair of expressions and a data transform rule. One of the expressions describes what information to extract from the Product Nodes (i.e., the question to ask) and the other expression describes what in the template to populate with the answer to the question (i.e., where to provide the answer). The data transform for a JDF-based system is required since the form of the data in the Product and Process nodes are often different. The data transform implementation in the specific case of JDF is non-trivial, which is a motivation to use a "rules based" system.

Given the complexity of transforming JDF Product Descriptions into a Process Network, the heuristic engine can likewise be fairly complex. The engine can classifies the Product Description, selects the templates and then populate them by extracting an expression from the Product Description. This may include the use of heuristics to resolve contextual ambiguity. For example, if the expression is "JDF/CustomerInfo@CustomerJobName," then the engine may need to resolve whether or not this is extracted from the root JDF node or a child JDF node depending on the precise structure of the JDF Product node. Using the data transform rule associated with the path expression the extracted data is translated into a form suitable for the Process Template. Again, this may include heuristics to resolve ambiguity not easily expressed in the data transform rule. The completed template is compared to the JDF Capability Description for the template and either accepted of reject based on policy.

It should be appreciated that various other alternatives, modifications, variations, improvements, equivalents, or substantial equivalents of the teachings herein that, for example, are or may be presently unforeseen, unappreciated, or subsequently arrived at the applicants or others are also intended to be encompassed by the claims and amendments thereto.

The invention claimed is:

1. A system for transforming a product description associated with printing into a process network specifying how to create a product, comprising:
   a common classification system linking product descriptions associated with printing and processing instructions required to create a product;
   at least one predefined template comprising partially completed process network specifications for creating a product; and
   a heuristic engine classifying at least one product description associated with printing into a product class in the common classification system.

2. The system of claim 1 wherein said at least one predefined template further comprises a capabilities description specific to the process network defined by the at least one predefined template.

3. The system of claim 2 wherein said capabilities description includes a description associated with printing.

4. The system of claim 1 wherein said at least one predefined template further comprises a set of questions that must be completed by a user in order to complete the predefined template.

5. The system of claim 2 wherein said capabilities description includes a description associated with product binding.

6. The system of claim 1 wherein said at least one product description includes a description associated with product binding.

7. The system of claim 1 wherein said at least one product description includes a description associated with product color.

8. The system of claim 1 wherein said at least one product description includes a description associated with product layout.

9. A method for transforming product descriptions into a process network specifying how to create a product, comprising the steps of:

classifying product descriptions into at least one class within a system of classification;

selecting templates for said at least one class that represent at least one product description;

using a heuristic engine to ask product description questions of a user, said questions associated with each template, said heuristic engine further populating said templates with answers to the questions until each template is complete;

comparing completed templates with processing instructions against capabilities descriptions associated with the templates; and determining if the completed template is within boundaries defined by said capabilities descriptions.

10. The method of claim 9 wherein said completed templates are provided to an agent if it is determined that the completed templates are within the boundaries defined by the capabilities descriptions.

11. The method of claim 9 wherein a completed template can be discarded if it is determined that a completed template is not within the boundaries defined by the capabilities descriptions.

12. The method of claim 9 wherein a completed template can be dynamically populated within the constraints of available capabilities if it is determined that a completed template is not within the boundaries defined by the capabilities descriptions.

13. The method of claim 9 wherein a completed template can be flagged as an unsupported process network for provided product descriptions if it is determined that a completed template is not within the boundaries defined by the capabilities descriptions.

14. A method for transforming a product description into a process network specifying how to create the product, comprising the steps of:

defining a system of classification;

defining rules and heuristics required to classify product descriptions into classes in the system of classification;

defining templates for classes in the system of classification; and associating a set of questions and at least one capabilities description with each template.

15. The system of claim 14 wherein said at least one capabilities description includes a description associated with printing.

16. The system of claim 14 wherein said at least one capabilities description includes a description associated with product binding.

17. The system of claim 14 wherein said at least one capabilities description includes a description associated with product color.

18. The system of claim 14 wherein said at least one capabilities description includes a description associated with product layout.

* * * * *

UNITED STATES PATENT AND TRADEMARK OFFICE
CERTIFICATE OF CORRECTION

PATENT NO. : 7,406,357 B2 Page 1 of 1
APPLICATION NO. : 11/121629
DATED : July 29, 2008
INVENTOR(S) : Kirk John Ocke et al.

It is certified that error appears in the above-identified patent and that said Letters Patent is hereby corrected as shown below:

Title Page:
Item [75] Inventors, please delete "Shephard" and insert therefor --Shepherd--.

Signed and Sealed this

Sixteenth Day of September, 2008

JON W. DUDAS
*Director of the United States Patent and Trademark Office*